United States Patent [19]
Brill et al.

[11] 4,241,356
[45] Dec. 23, 1980

[54] RECORDING MEDIUM FOR THERMOGRAPHIC RECORDING OF DATA ITEMS

[75] Inventors: Klaus Brill, Korntal; Wolfgang Grothe, Tiefenbronn, both of Fed. Rep. of Germany

[73] Assignee: Robert Bosch GmbH, Stuttgart, Fed. Rep. of Germany

[21] Appl. No.: 34,258

[22] Filed: Apr. 30, 1979

Related U.S. Application Data

[63] Continuation of Ser. No. 839,378, Oct. 4, 1977.

Foreign Application Priority Data

[30] Oct. 8, 1976 [DE] Fed. Rep. of Germany ....... 2645485

[51] Int. Cl.$^3$ ............................................. G01D 15/34
[52] U.S. Cl. .................... 346/135.1; 346/163; 428/651; 428/652; 428/680
[58] Field of Search ................. 346/135.1, 76 R, 164, 346/163, 162; 428/651, 652, 680

[56] References Cited

U.S. PATENT DOCUMENTS

| | | | |
|---|---|---|---|
| 2,726,179 | 12/1955 | Ortlieb | 346/135.1 X |
| 2,808,345 | 10/1957 | Traub | 346/135.1 X |
| 3,657,721 | 4/1972 | Traub | 346/135.1 |
| 3,831,179 | 8/1974 | Brill | 346/135.1 X |
| 3,995,083 | 11/1976 | Reichle | 346/135.1 X |
| 4,024,546 | 5/1977 | Brill | 346/135.1 |
| 4,143,382 | 3/1979 | Brill | 346/76 PH |

*Primary Examiner*—Joseph W. Hartary
*Attorney, Agent, or Firm*—Frishauf, Holtz, Goodman, Woodward

[57] ABSTRACT

To improve the corrosion resistance of a metallic layer which is being burned off by electrodes, and decrease the contact pressure of the electrodes by eliminating metallic residues upon an electrical discharge between an electrode and a metallic surface, the metallic surface layer is a two-metal system having a top layer of aluminum and an intermediate layer of nickel, the metals, upon electrical discharge in air, reacting in an exothermal reaction if the energy level of the electrical discharge between the electrode and the metallic surface is sufficient to initiate the reaction.

14 Claims, 1 Drawing Figure

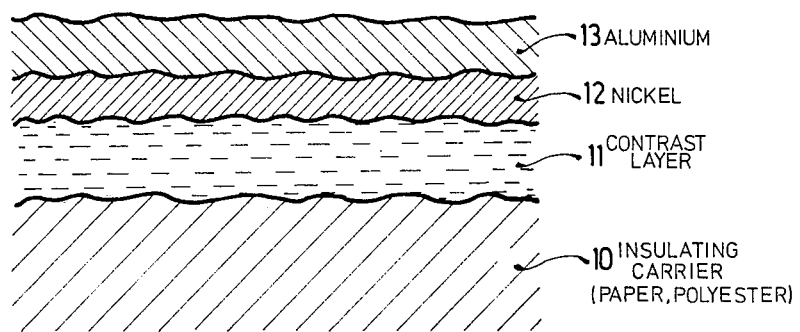

RECORDING MEDIUM FOR THERMOGRAPHIC RECORDING OF DATA ITEMS

This is a continuation of application Ser. No. 839,378, filed Oct. 4, 1977.

Cross reference to related patents, assigned to the assignee of the present application:
U.S. Pat. No. 3,831,179, Brill et al;
U.S. Pat. No. 3,995,083, Reichle;
U.S. Ser. No. 776,853, filed Mar. 11, 1977 now U.S. Pat. No. 4,143,382, Brill.

The present invention relates to a recording medium and more particularly to a metal-coated paper used in electrosensitive (which includes operation as a consequence of at least in part of thermal effects) recording of data items in which an electrode contacts the metallic layer of the medium and, if a data item is to be recorded, an electrical voltage is impressed between the electrode and the metallic surface, the metallic surface being vaporized or burned off between the electrode to leave the underlying substrate carrier, typically paper, exposed and thus provide a contrasting mark representative of the data item to be recorded.

BACKGROUND AND PRIOR ART

It has previously been proposed to provide recording media, typically recording paper, by applying an aluminum coating or layer on a substrate, typically paper, but which may also by a plastic, for example a polyester such as Mylar. Upon recording, electrical energy is supplied at selected discrete positions, for example by an electrode, the electrical energy burning off the aluminum layer beneath the electrode, or electrodes. Such recording media provide satisfactory recording results. To increase the contrast between the non-burned regions of the recording medium and the underlying paper or other substrate, it has also been proposed to introduce an intervening contrast layer of a lacquer, or otherwise colored material, such as, for example printing ink.

THE INVENTION

It is an object of the present invention to provide a recording paper which can operate with recording electrodes at lesser electrode pressure and which has improved resistance to corrosion with respect to previously known recording media.

Briefly, the metal layer is a multi-layer multi-component system in which the components of the system in the presence of an electrical discharge and air react in an exothermal reaction, provided the electrical discharge has an energy level sufficient to initiate the reaction. Preferably, the multicomponent system is a two-component two layer system in which one of the component systems is applied as a first layer on the medium and the other applied as a top layer thereover. In a preferred form of the invention, the two-component system comprises a layer of nickel on which a layer of aluminum is applied. A contrasting layer may be applied beneath the first metallic layer and the substrate carrier.

The recording medium permits operation at a lower engagement pressure of the electrode on the exposed metal layer. It is believed that the reason which permits the decrease of the engagement pressure is the elimination of the formation of oxides at, or on the writing electrodes. These oxides form deposits, or slags on the electrodes which have to be removed by mechanical pressure of the electrode against the substrate. Elimination of the oxide residues and the decreased engagement pressure are apparently intimately coupled: in the chemical reaction of the two components of the metallic recording layer, residues in dust or powder form apparently result which then do not adhere to the writing electrode, so that no slags or hair-like filamentary residues will adhere to the electrode, thus eliminating the requirement to remove these residues adhering to the electrodes by increased contact pressure against the substrate. The recording paper and the writing electrode move relative to each other—typically by feeding the recording paper along a recording path—so that the frictional engagement of the moving recording medium with the writing electrode previously was used to remove these residues from the electrodes. The aluminum-nickel combination of the system permits complete burning of the metallic layer without metallic residues at the recording trace, resulting in a clear and sharp recording marking. The corrosion resistance additionally has been improved over a recording paper or medium on which only aluminum is used as the top layer.

The increased resistance against corrosion of the recording medium using aluminum and nickel, in the preferred embodiment, apparently is essentially obtained by the high corrosion resistance of the nickel layer which isolates the aluminum layer with respect to corrosive affects derived from the substrate on which the aluminum layer is applied.

The recording layer is completely burned out during recording at the mark which is to be made, that is, in the area beneath the electrode. Due to the complete combustion of the metallic layer, a chemical reaction between aluminum and nickel is obtained which is rich in energy if a certain temperature is exceeded. The resulting reaction will completely eliminate the metal of the top layers or coatings where it is removed by burning off, so that no metallic residues will remain in the recording or marking trace.

The electrical conductivity of a nickel layer is improved with respect to a metallic oxide layer which will necessarily form when aluminum is deposited, for example in a vaporization deposition process on the surface of a substrate, typically paper. Both metallic layers, that is, the aluminum and the nickel layer each can be made thinner than the prior metallic layer without substantially decreasing the resulting electrical conductivity of the metallic layer. Decreasing the mass, or quantity of metal forming the metallic coating or layer on the substrate necessarily decreases the quantity of metal which must be removed to form a recording mark. This, further decreases the energy necessary to form a burned-off region, the time required to vaporize or burn the metallic layer beneath the electrode and the quantity of the resulting combustion residues.

The optical characteristics of the nickel layer permit a still additional decrease of the thickness of the aluminum layer since the nickel prevents background appearance of the contrast layer, or the substrate, that is, prevents shine-through, or show-through thereof. The substrate usually is coated with a colored contrasting layer to provide improved contrast with respect to the metallic surface in order to insure good visibility and legibility of the resulting marking upon energization of the writing electrode, or writing electrodes.

The contrasting layer facilitates recognition of the marking placed on the substrate, by providing better contrast of the marking with respect to the surrounding metallized area. Such a contrasting layer may be applied, for example, by intaglio printing, or by application of lacquer, or other materials by spreading, for example, by spreading rollers. Such a contrasting layer additionally permits modifying the surface of the supporting substrate web, which may be paper or plastic. The contrasting layer can be used, for example, to provide a surface which is smooth by applying a lacquer on a rough paper or other substrate; conversely, the contrasting layer can be used to provide a certain degree of roughness if the substrate is smooth, for example if the substrate is a plastic foil. Filler materials introduced in the contrasting layer can be added to provide just the right amount of surface roughness for optimum application of the metallic layer thereover, thus improving the writing characteristics of the overall recording medium while simultaneously decreasing excessive reflection of light at the metallic surface thereof.

In a preferred form of the invention, the layers are a nickel layer applied to the substrate—preferably on an intervening contrast layer and an aluminum layer thereabove. A particularly suitable relationship of the metallic components is obtained is both components are available in the metallic coating layer with each 50% of atomic weight. In an optimum condition, then, each unit surface area must contain in the metallic layers 59 parts nickel and 27 parts by weight of aluminum. Experiments have shown, however, that the recording paper is operative within substantially wider ranges of the relationship of the materials, by weight (or mass). For recording paper, the range for the nickel coating is at about 3 to 40 $\mu g/cm^2$; for the aluminum layer it is 2 to 10 $\mu g/cm^2$. In a preferred form, the composition is 5 to 10 $\mu g/cm^2$ nickel and 3 to 5 $\mu g/cm^2$ aluminum.

DRAWING

In which the single FIGURE illustrates a schematic cross-section through the recording carrier, in one example.

In insulating carrier 10, for example a paper, or polyester web has a contrasting layer 11 applied to one surface thereof. Layer 11 may, for example, be a layer of colored ink applied to intaglio printing. Contrasting layer 11 has a layer of nickel 12 applied thereover, on which aluminum layer 13 is supplied by vapor deposition. The metallic recording coating, thus, is a two-component system comprising nickel and aluminum.

In accordance with an essential concept of the invention, the components nickel and aluminum react violently at a temperature of about 1600° C., while generating heat. This substantially improves the burn-out characteristic of the layer beneath the electrode.

An electrode—not shown—in generating a spark, or arc between the electrode and the metallic surface layer then is not required to supply the entire combustion energy; rather, it is only needed to supply sufficient energy to initiate combustion, that is, to initiate the chemical reaction which will occur under strong exothermic conditions, and will include all metallic components within the range of the spark, that is, within the combustion region.

In an experimental recording medium, the square resistance of the layers were about 10 Ohms per square for the nickel layer and 3 Ohms per square for the aluminum layer. In another experimental medium, the nickel layer had 5 Ohms per square and the aluminum layer also 5 Ohms per square. The surface coatings of these layers having these resistances are within the above given thicknesses or coverings of weight per square centimeters given above, and both provided good recording results, with good contrast and sharpness of the resulting recording indicia.

Other metals may be used in place of nickel as the layer 12, e.g., manganese, zirconium, titanium and cerium, and preferably cobalt. Similarly, aluminum may be replaced as the layer 13 by another metal, e.g., zinc. These layers are applied, preferably in a quantity of 3-40 $\mu g/cm^2$ for layer 12 and 2-10 $\mu g/cm^2$ for layer 13. The respective resistances of these layers then would be between 5-500 Ohms per square for layer 12, 2-10 Ohms per square for layer 13. The combination of aluminum and cobalt is most closely related to the combination of aluminum and nickel.

Since the operation of the recording medium of the present invention is at least in part based on the exothermic reaction between the two metallic layers, it is possible to reverse the layers, i.e., to have layer 13 on the surface on top of layer 12.

The electrodes (or writing styli) used to mark the recording medium typically have writing tips forming contacts made of tungsten, chromium-nickel steel, or beryllium-bronze.

A typical recording voltage, of the prior art, is 35 V, with a recording electrode or stylus pressure of 1 g. By use of the present invention, a similar electrode with a recording voltage of 25 V and a stylus pressure of 0.05 g could be used, without deterioration of the electrode due to formation of deposits thereon.

Various changes and modifications may be made within the scope of the inventive concept.

We claim:

1. Recording medium for electrosensitive recording of data items having a substrate (10) and a metallic layer (12, 13) thereover, in which the metallic layer on the substrate (10) is adapted to be removed by an electrical discharge by burning off the metallic layer beneath the electrode in contact with the medium to leave a visible mark representative of a data item to be recorded,
    wherein, in accordance with the invention,
    the metallic layer comprises a two-metal, two-layer system comprising a top layer of aluminum (13) and a layer of metallic nickel (12) applied therebeneath, the aluminum and nickel being present in respective quantities relative to each other to chemically react with each other in an exothermal reaction upon application of an electrical discharge of sufficient energy to initiate a chemical reaction of the nickel with the aluminum.

2. Recording medium according to claim 1, wherein the nickel layer (12) is located between the substrate (10) and the aluminum layer (13).

3. Recording medium according to claim 1, further comprising a contrasting layer (11) located between the substrate (10) and the two-metal, two-layer system.

4. Recording medium according to claim 3, wherein the contrasting layer comprises at least one of: lacquer; printing ink.

5. Recording medium according to claim 1, wherein the aluminum and nickel are present in about 50% each by atomic weight.

6. Recording medium according to claim 1, wherein the aluminum and nickel are present in about 27 parts aluminum and 59 parts nickel, by weight.

7. Recording medium according to claim 1, wherein the mass ratio of the metallic components of the two-metal, two-layer system (12, 13) is: 3–40 μg/cm² nickel and 2–10 μg/cm² aluminum.

8. Recording medium according to claim 1, wherein the mass ratio of the two-metal, two-layer system is 5–10 μg/cm² nickel and 3–5 μg/cm² aluminum.

9. Recording medium according to claim 1, wherein the substrate (10) comprises at least one of: paper; polyester;

a contrasting layer comprising at least one of: lacquer; printing ink is present positioned between the substrate (10) and the nickel layer (12), so that the nickel will be proximate to the contrasting layer and the aluminum layer will form an exposed layer for engagement by the electrode; and wherein the mass ratio of the metallic components of the two-metal, two-layer system (12, 13) is: 3–40 μg/cm² nickel and 2–10 μg/cm² aluminum.

10. Recording medium for electrosensitive recording of data items having a substrate (10) and a metallic layer (12, 13) thereover, in which the metallic layer on the substrate (10) is adapted to be removed by electrical discharge by burning off the layer beneath an electrode in contact with the medium to leave a visible mark representative of the data item to be recorded, wherein the metal layer comprises a top layer component comprising a metal selected from the group consisting of aluminum and zinc, and a second metallic layer component (12) thereinbeneath comprising a metal selected from the group consisting of nickel, cobalt, manganese, zirconium, titanium, and cerium, and forming layered components of a two-metal component system, the two-metal components of the system being present in relative quantities of about 50% each by atomic weight to chemically react with each other in an exothermal reaction upon being subjected to an electrical discharge at an energy level sufficient to initiate the reaction of the metals with each other;

and a contrasting layer (11) located between the substrate (10) and the second layer component (12) beneath the top layer component.

11. Recording medium according to claim 25, wherein said metal layer component forming said top layer component (13) is aluminum, and the metal layer (12) forming the second component is selected from the group consisting of nickel and cobalt.

12. Recording medium according to claim 11 wherein said metal component forming said second layer component (12) comprises nickel; and the mass ratio of the aluminum and the nickel layers is 3–40 μg/cm² nickel and 2–10 μg/cm² aluminum.

13. Recording medium according to claim 11, wherein said metal component forming said second layer component (12) comprises nickel; and the mass ratio of the aluminum and the nickel layers is: 5–10 μg/cm² nickel and 3–5 μg/cm² aluminum.

14. Recording medium according to claim 12, wherein the contrating layer comprises at least one of: lacquer; printing ink.

* * * * *